(12) United States Patent
Chen et al.

(10) Patent No.: US 11,502,806 B2
(45) Date of Patent: Nov. 15, 2022

(54) METHOD AND APPARATUS FOR SENDING AND RECEIVING UPLINK CONTROL INFORMATION

(71) Applicant: Huawei Technologies Co., Ltd., Shenzhen (CN)

(72) Inventors: Zheng Chen, Beijing (CN); Xu Zhang, Beijing (CN); Jianguo Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 17/009,488

(22) Filed: Sep. 1, 2020

(65) Prior Publication Data

US 2020/0403755 A1 Dec. 24, 2020

Related U.S. Application Data

(63) Continuation of application No. PCT/CN2019/076689, filed on Mar. 1, 2019.

(30) Foreign Application Priority Data

Mar. 2, 2018 (CN) .......................... 201810176133.2

(51) Int. Cl.
*H04L 5/00* (2006.01)
*H04W 72/12* (2009.01)

(52) U.S. Cl.
CPC .......... *H04L 5/0055* (2013.01); *H04L 5/0007* (2013.01); *H04W 72/1273* (2013.01); *H04W 72/1289* (2013.01)

(58) Field of Classification Search
CPC ... H04L 5/0055; H04L 5/0007; H04L 1/1854; H04L 5/0094; H04L 1/1829; H04W 72/1273; H04W 72/1289
See application file for complete search history.

(56) References Cited

U.S. PATENT DOCUMENTS

2011/0090825 A1 4/2011 Papasakellariou et al.
2011/0235586 A1 9/2011 Han et al.
(Continued)

FOREIGN PATENT DOCUMENTS

CN 101882982 A 11/2010
CN 101998539 A 3/2011
(Continued)

*Primary Examiner* — Sharmin Chowdhury
(74) *Attorney, Agent, or Firm* — Leydig, Voit & Mayer, Ltd.

(57) ABSTRACT

A method and an apparatus is provided for sending and receiving uplink control information, including: receiving, by a terminal, a first PDCCH and a second PDCCH that are sent by a network device, where the first PDCCH and the second PDCCH are transmitted in a same time unit, the first PDCCH indicates a first PUCCH resource and is used to schedule a first downlink TB, and the second PDCCH indicates a second PUCCH resource and is used to schedule a second downlink TB; and sending, by the terminal on the first PUCCH resource, response information of the first downlink TB and response information of the second downlink TB to the network device. When one PUCCH fails to be received, the network device may obtain the response information of the two downlink TBs from the other PUCCH, thereby ensuring that HARQ feedback information of the downlink TBs is correctly received.

14 Claims, 5 Drawing Sheets

(56) References Cited

U.S. PATENT DOCUMENTS

| | | | |
|---|---|---|---|
| 2012/0039275 A1 | 2/2012 | Chen et al. | |
| 2013/0170462 A1 | 7/2013 | Seo et al. | |
| 2015/0131579 A1* | 5/2015 | Li | H04L 1/1858 |
| | | | 370/329 |
| 2020/0260475 A1* | 8/2020 | Yoshimura | H04L 5/0048 |
| 2020/0280396 A1* | 9/2020 | Gao | H04L 1/1861 |
| 2020/0404652 A1* | 12/2020 | Matsumura | H04L 5/0053 |
| 2021/0143945 A1* | 5/2021 | Park | H04L 1/1861 |

FOREIGN PATENT DOCUMENTS

| | | |
|---|---|---|
| CN | 102014510 A | 4/2011 |
| CN | 102379150 A | 3/2012 |
| CN | 102394685 A | 3/2012 |
| CN | 102571287 A | 7/2012 |
| CN | 104348589 A | 2/2015 |
| EP | 2562954 A1 | 2/2013 |

\* cited by examiner

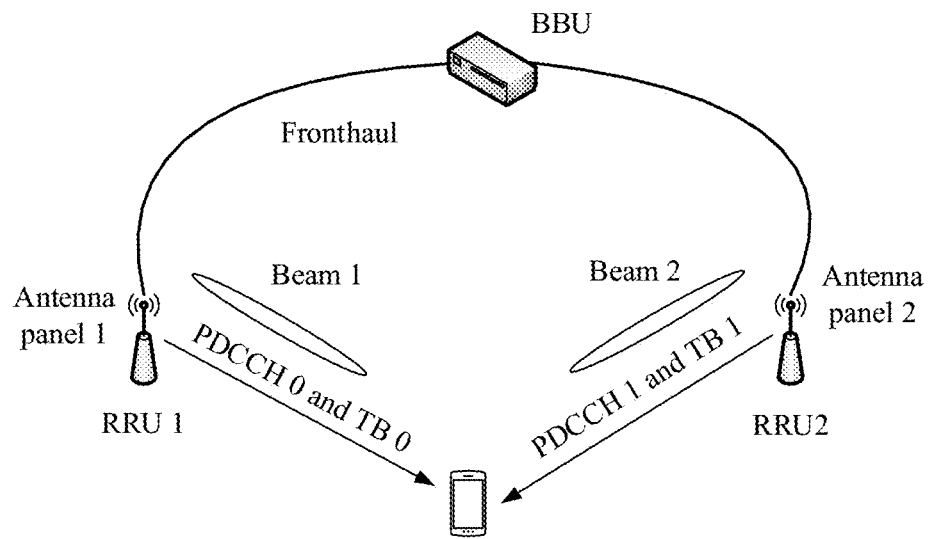

FIG. 1

```
A terminal device receives a first PDCCH and a second
PDCCH that are sent by a network device, where the first
PDCCH and the second PDCCH are transmitted in a same
time unit, the first PDCCH indicates a first PUCCH resource
and is used to schedule a first downlink TB, and the second
PDCCH indicates a second PUCCH resource and is used to
schedule a second downlink TB
```
S101

```
The terminal device sends, on the first PUCCH resource,
response information of the first downlink TB and response
information of the second downlink TB to the network device
```
S102

FIG. 2

METHOD AND APPARATUS FOR SENDING AND RECEIVING UPLINK CONTROL INFORMATION

CROSS-REFERENCE TO RELATED APPLICATIONS

This application is a continuation of International Application No. PCT/CN2019/076689, filed on Mar. 1, 2019, which claims priority to Chinese Patent Application No. 201810176133.2, filed on Mar. 2, 2018. The disclosures of the aforementioned applications are hereby incorporated by reference in their entireties.

TECHNICAL FIELD

Embodiments of this application relate to communications technologies, and in particular, to a method and an apparatus for sending and receiving uplink control information.

BACKGROUND

In a 5th generation (5G) mobile communications system, a base station supports sending two physical downlink control channels (PDCCH) to one user equipment (UE) in one slot (slot), and both the two PDCCHs are used to schedule physical downlink shared channel (PDSCH) resources for the UE.

In an implementation, the base station includes two antenna array panels: an antenna panel 1 and an antenna panel 2. Each antenna panel includes a plurality of antenna array elements. Different antenna panels may be relatively far away from each other in space, and different antenna panels may send different beams. In a same slot, the antenna panel 1 sends, to the UE by using a downlink beam 1, a PDCCH 0 and a transport block (TB) 0 scheduled by using the PDCCH 0, and the antenna panel 2 sends, to the UE by using a downlink beam 2, a PDCCH 1 and a TB 1 scheduled by using the PDCCH 1. After receiving the PDCCHs and the TBs that are sent by the two antenna panels, the UE needs to feed back hybrid automatic repeat acknowledgment request (HARQ) information of the two TBs to the base station. The HARQ feedback information may be acknowledgment or negative acknowledgment. In the prior art, after receiving the two PDCCHs and the TBs, the UE separately sends PUCCHs to the two antenna panels, and each PUCCH carries the HARQ feedback information of the TB sent by the corresponding antenna panel. For example, the UE transmits a PUCCH 0 to the antenna panel 1 by using an uplink beam 1, and the PUCCH 0 carries the HARQ feedback information of the TB 0. The UE transmits a PUCCH 1 to the antenna panel 2 by using an uplink beam 2, and the PUCCH 1 carries the HARQ feedback information of the TB 1. The base station performs combination processing on the PUCCH signals received by the two antenna panels.

In the foregoing method, when the UE transmits a PUCCH to a corresponding antenna panel by using an uplink beam, a coverage area of a single uplink beam in a sector is relatively small, and a path loss at a high carrier frequency is relatively large. If a signal transmitted by using the uplink beam is blocked, an uplink beam link is easy to fail, and the corresponding antenna panel cannot receive the PUCCH. Consequently, the base station cannot receive the HARQ feedback information of the TB.

SUMMARY

This application provides a method and an apparatus for sending and receiving uplink control information, to ensure that a network device correctly receives HARQ feedback information of a downlink TB.

A first aspect of this application provides a method for sending uplink control information, including: receiving a first physical downlink control channel PDCCH and a second PDCCH that are sent by a network device, where the first PDCCH and the second PDCCH are transmitted in a same time unit, the first PDCCH indicates a first physical uplink control channel PUCCH resource and is used to schedule a first downlink transport block TB, and the second PDCCH indicates a second PUCCH resource and is used to schedule a second downlink TB; and sending, on the first PUCCH resource, response information of the first downlink TB and response information of the second downlink TB to the network device.

Optionally, the method further includes: sending, on the second PUCCH resource, the response information of the first downlink TB and/or the response information of the second downlink TB.

Optionally, the method further includes: determining, based on first indication information corresponding to each PDCCH, response information carried on a PUCCH resource indicated by the PDCCH, where the first indication information is used to indicate that the response information carried on the PUCCH resource indicated by the PDCCH is response information of a downlink TB scheduled by using the PDCCH or response information of downlink TBs scheduled by using two PDCCHs, and the first indication information is carried in downlink control information DCI carried by the PDCCH.

Optionally, the method further includes: determining, based on first indication information corresponding to each PDCCH, response information carried on a PUCCH resource indicated by the PDCCH, where the first indication information is used to indicate that the response information carried on the PUCCH resource indicated by the PDCCH transmitted in a control resource set to which the PDCCH belongs is response information of a downlink TB scheduled by using the transmitted PDCCH or response information of downlink TBs scheduled by using two PDCCHs, and the first indication information is carried in higher layer signaling.

Optionally, the first PDCCH further indicates a third PUCCH resource, and the method further includes: sending, on the third PUCCH resource, the response information of the first downlink TB and/or the response information of the second downlink TB.

Optionally, the method further includes: determining the first PUCCH resource and the third PUCCH resource based on information that is about an uplink resource indicator field and that is carried in the first PDCCH and configuration information of two PUCCH resource sets configured by the network device by using the higher layer signaling.

Optionally, the determining the first PUCCH resource and the third PUCCH resource based on information that is about an uplink resource indicator field and that is carried in the first PDCCH and configuration information of two PUCCH resource sets configured by the network device includes: obtaining through demodulation, based on a control resource set corresponding to an identifier of the control resource set associated with the two PUCCH resource sets, the first PDCCH from the control resource set, where the identifier of the control resource set is configured by the network device by using the higher layer signaling; determining, based on a value that is of the uplink resource indicator field and that is carried in the first PDCCH, an index value of a PUCCH resource indicated by the first PDCCH; and determining the first PUCCH resource and the third PUCCH resource from the two PUCCH resource sets based on the index value of the PUCCH resource indicated by the first PDCCH.

Optionally, the method further includes: determining, based on second indication information carried in the first PDCCH, that response information of a downlink TB is fed back on both the first PUCCH resource and the third PUCCH resource, where the second indication information is used to indicate whether all PUCCH resources indicated by the first PDCCH are used to feed back the response information of the downlink TB.

Optionally, the method further includes: determining, based on first time information carried in the first PDCCH, a sequence number of a time unit for receiving the first PDCCH, and the configuration information of the two PUCCH resource sets configured by the network device by using the higher layer signaling, sequence numbers of time units for sending the first PUCCH resource and the third PUCCH resource; and sending, on the first PUCCH resource and the third PUCCH resource, the response information to the network device based on the sequence numbers of the time units.

Optionally, configuration information of each PUCCH resource set includes an offset factor, and the determining, based on first time information carried in the first PDCCH, a sequence number of a time unit for receiving the first PDCCH, and the configuration information of the two PUCCH resource sets configured by the network device by using the higher layer signaling, sequence numbers of time units for sending the first PUCCH resource and the third PUCCH resource includes: determining, according to the following formula, a sequence number of a transmission unit for sending the PUCCH resource: $n'=n+k_1+k_{offset}$, where n' is the sequence number of the transmission unit for sending the PUCCH resource, n is a sequence number of a transmission unit for receiving the PDCCH, $k_{offset}$ is the offset factor, and $k_1$ is the first time information.

A second aspect of this application provides a method for receiving uplink control information, including: sending a first physical downlink control channel PDCCH and a second PDCCH to a terminal device, where the first PDCCH and the second PDCCH are transmitted in a same time unit, the first PDCCH indicates a first physical uplink control channel PUCCH resource and is used to schedule a first downlink transport block TB, and the second PDCCH indicates a second PUCCH resource and is used to schedule a second downlink TB; and receiving response information of the first downlink TB and response information of the second downlink TB that are sent by the terminal device on the first PUCCH resource.

Optionally, the method further includes: receiving the response information of the first downlink TB and/or the response information of the second downlink TB that are/is sent by the terminal device on the second PUCCH resource.

Optionally, downlink control information DCI carried by each PDCCH includes first indication information, and the first indication information is used to indicate that response information carried on a PUCCH resource indicated by the PDCCH is response information of a downlink TB scheduled by using the PDCCH or response information of downlink TBs scheduled by using two PDCCHs.

Optionally, the method further includes: sending, to the terminal device by using higher layer signaling, first indication information corresponding to each PDCCH, where the first indication information is used to indicate that response information carried on a PUCCH resource indicated by the PDCCH transmitted in a control resource set to which the PDCCH belongs is response information of a downlink TB scheduled by using the transmitted PDCCH or response information of downlink TBs scheduled by using two PDCCHs.

Optionally, the first PDCCH further indicates a third PUCCH resource, and the method further includes: receiving the response information of the first downlink TB and/or the response information of the second downlink TB that are/is sent by the terminal device on the third PUCCH resource.

Optionally, the method further includes: sending configuration information of two PUCCH resource sets to the terminal device by using the higher layer signaling, where the configuration information of the two PUCCH resource sets is used to determine the first PUCCH resource, the third PUCCH resource, and sequence numbers of time units for sending the first PUCCH resource and the third PUCCH resource.

Optionally, the method further includes: sending, to the terminal device by using the higher layer signaling, an identifier of a control resource set associated with the two PUCCH resource sets, where the identifier of the control resource set is used by the terminal device to determine the first PUCCH resource and the second PUCCH resource.

Optionally, the first PDCCH further carries second indication information, and the second indication information is used to indicate whether all PUCCH resources indicated by the first PDCCH are used to feed back response information of a downlink TB.

Optionally, configuration information of each PUCCH resource set includes an offset factor, and the offset factor is used by the terminal device to determine a sequence number of a time unit for sending the first PUCCH resource or the third PUCCH resource.

A third aspect of this application provides a method for sending uplink control information, including: receiving N PDCCHs sent by a network device, where the N PDCCHs are transmitted in a same time unit, and each PDCCH indicates a PUCCH resource and is used to schedule a downlink transport block TB, and n is an integer greater than or equal to 2; and sending, on N PUCCH resources, response information of downlink TBs to the network device, where at least one of the N PUCCH resources carries the response information of the downlink TBs scheduled by using the N PDCCHs.

Optionally, the response information of the downlink TBs is sent to the network device on M PUCCH resources, where at least one of the M PUCCH resources carries the response information of the downlink TBs scheduled by using the N PDCCHs, and M is an integer greater than or equal to 1.

Optionally, each of the N PUCCH resources carries the response information of the downlink TBs scheduled by using the N PDCCHs.

Optionally, each of the M PUCCH resources carries the response information of the downlink TBs scheduled by using the N PDCCHs, where M is an integer greater than or equal to 1.

Optionally, scheduling of each of the TBs by using the PDCCHs is slot scheduling (slot scheduling), that is, a mapping type of a PDSCH on which the TB is located is a PDSCH mapping type A.

Optionally, scheduling of each of the TBs by using the PDCCHs is non-slot scheduling (non-slot scheduling), that is, a mapping type of a PDSCH on which the TB is located is a PDSCH mapping type B.

Optionally, the method further includes: determining, based on first indication information corresponding to each PDCCH, response information carried on a PUCCH resource indicated by the PDCCH, where the first indication information is used to indicate that the response information carried on the PUCCH resource indicated by the PDCCH is response information of a downlink TB scheduled by using the PDCCH or response information of the downlink TBs scheduled by using the N PDCCHs, and the first indication information is carried in downlink control information DCI carried by the PDCCH.

Optionally, the method further includes: determining, based on first indication information corresponding to each PDCCH, response information carried on a PUCCH resource indicated by the PDCCH, where the first indication information is used to indicate that the response information carried on the PUCCH resource indicated by the PDCCH transmitted in a control resource set to which the PDCCH belongs is response information of a downlink TB scheduled by using the transmitted PDCCH or response information of the downlink TBs scheduled by using the N PDCCHs, and the first indication information is carried in higher layer signaling.

A third aspect of this application provides a method for sending uplink control information, including: receiving N PDCCHs sent by a network device, where the N PDCCHs are transmitted in a same time unit, and each PDCCH indicates a PUCCH resource and is used to schedule a downlink transport block TB, and n is an integer greater than or equal to 2; and sending, on N PUCCH resources, response information of downlink TBs to the network device, where at least one of the N PUCCH resources carries the response information of the downlink TBs scheduled by using the N PDCCHs.

Optionally, each of the N PUCCH resources carries the response information of the downlink TBs scheduled by using the N PDCCHs.

Optionally, the method further includes: determining, based on first indication information corresponding to each PDCCH, response information carried on a PUCCH resource indicated by the PDCCH, where the first indication information is used to indicate that the response information carried on the PUCCH resource indicated by the PDCCH is response information of a downlink TB scheduled by using the PDCCH or response information of the downlink TBs scheduled by using the N PDCCHs, and the first indication information is carried in downlink control information DCI carried by the PDCCH.

Optionally, the method further includes: determining, based on first indication information corresponding to each PDCCH, response information carried on a PUCCH resource indicated by the PDCCH, where the first indication information is used to indicate that the response information carried on the PUCCH resource indicated by the PDCCH transmitted in a control resource set to which the PDCCH belongs is response information of a downlink TB scheduled by using the transmitted PDCCH or response information of the downlink TBs scheduled by using the N PDCCHs, and the first indication information is carried in higher layer signaling.

Optionally, a first PDCCH in the N PDCCHs is used to indicate the N PUCCH resources, and the first PDCCH is any one of the N PDCCHs.

Optionally, the method further includes: determining the N PUCCH resources based on information that is about an uplink resource indicator field and that is carried in the first PDCCH and configuration information of N PUCCH resource sets configured by the network device by using the higher layer signaling.

Optionally, the determining the N PUCCH resources based on information that is about an uplink resource indicator field and that is carried in the first PDCCH and configuration information of N PUCCH resource sets configured by the network device includes: obtaining through demodulation, based on a control resource set corresponding to an identifier of the control resource set associated with the N PUCCH resource sets, the first PDCCH from the control resource set, where the identifier of the control resource set is configured by the network device by using the higher layer signaling; determining, based on a value that is of the uplink resource indicator field and that is carried in the first PDCCH, an index value of a PUCCH resource indicated by the first PDCCH; and determining the N PUCCH resources from the N PUCCH resource sets based on the index value of the PUCCH resource indicated by the first PDCCH.

Optionally, the method further includes: determining, based on second indication information carried in the first PDCCH, that the response information of the downlink TBs is fed back on the N PUCCH resource, where the second indication information is used to indicate whether all PUCCH resources indicated by the first PDCCH are used to feed back the response information of the downlink TBs.

Optionally, the method further includes: determining, based on first time information carried in the first PDCCH, a sequence number of a time unit for receiving the first PDCCH, and the configuration information of the N PUCCH resource sets configured by the network device by using the higher layer signaling, sequence numbers of time units for sending the N PUCCH resources; and sending, on the N PUCCH resources, the response information to the network device based on the sequence numbers of the time units.

Optionally, configuration information of each PUCCH resource set includes an offset factor, and the determining, based on first time information carried in the first PDCCH, a sequence number of a time unit for receiving the first PDCCH, and the configuration information of the N PUCCH resource sets configured by the network device by using the higher layer signaling, sequence numbers of time units for sending the N PUCCH resources includes: determining, according to the following formula, a sequence number of a transmission unit for sending the PUCCH resource: $n'=n+k_1+k_{offset}$, where $n'$ is the sequence number of the transmission unit for sending the PUCCH resource, n is a sequence number of a transmission unit for receiving the PDCCH, $k_{offset}$ is the offset factor, and $k_1$ is the first time information.

A fourth aspect of this application provides a method for receiving uplink control information, including: sending N PDCCHs to a terminal device, where the N PDCCHs are transmitted in a same time unit, each PDCCH indicates a PUCCH resource and is used to schedule a downlink transport block TB, and n is an integer greater than or equal to 2; and receiving response information of downlink TBs sent by the terminal device on N PUCCH resources, where at least one of the N PUCCH resources carries the response information of the downlink TBs scheduled by using the N PDCCHs.

Optionally, each of the N PUCCH resources carries the response information of the downlink TBs scheduled by using the N PDCCHs.

Optionally, downlink control information DCI carried by each PDCCH includes first indication information, and the first indication information is used to indicate that response information carried on a PUCCH resource indicated by the PDCCH is response information of a downlink TB scheduled by using the PDCCH or response information of the downlink TBs scheduled by using the N PDCCHs.

Optionally, the method further includes: sending, to the terminal device by using higher layer signaling, first indication information corresponding to each PDCCH, where the first indication information is used to indicate that response information carried on a PUCCH resource indicated by the PDCCH transmitted in a control resource set to which the PDCCH belongs is response information of a downlink TB scheduled by using the transmitted PDCCH or response information of the downlink TBs scheduled by using the N PDCCHs.

Optionally, a first PDCCH in the N PDCCHs is used to indicate the N PUCCH resources, and the first PDCCH is any one of the N PDCCHs.

Optionally, the method further includes: sending configuration information of N PUCCH resource sets to the terminal device by using the higher layer signaling, where the configuration information of the N PUCCH resource sets is used to determine the N PUCCH resources and sequence numbers of time units for sending the N PUCCH resources.

Optionally, the method further includes: sending, to the terminal device by using the higher layer signaling, an identifier of a control resource set associated with the N PUCCH resource sets, where the identifier of the control resource set is used by the terminal device to determine the N PUCCH resources.

Optionally, the first PDCCH further carries second indication information, and the second indication information is used to indicate whether all PUCCH resources indicated by the first PDCCH are used to feed back response information of a downlink TB.

Optionally, configuration information of each PUCCH resource set includes an offset factor, and the offset factor is used by the terminal device to determine the sequence numbers of the time units for sending the N PUCCH resources.

A fifth aspect of this application provides an apparatus for sending uplink control information. The apparatus may be a communications device (for example, a terminal device or a network device), or may be a chip in a communications device. The apparatus may include a processing unit and a transceiver unit. When the apparatus is the communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, so that the communications device is enabled to perform the method provided in the first aspect or the third aspect of this application. When the apparatus is the chip in the communications device, the processing unit may be a processor, and the transceiver unit may be an input/output interface, a pin, a circuit, or the like. The processing unit executes an instruction stored in a storage unit, so that the communications device is enabled to perform the method provided in the first aspect or the third aspect of this application. The storage unit may be a storage unit (for example, a register or a cache) in the chip, or may be a storage unit (for example, a read-only memory or a random access memory) that is in the communications device and that is located outside the chip.

A sixth aspect of this application provides an apparatus for receiving uplink control information. The apparatus may be a communications device (for example, a terminal device or a network device), or may be a chip in a communications device. The apparatus may include a processing unit and a transceiver unit. When the apparatus is the communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, so that the communications device is enabled to perform the method provided in the second aspect or the fourth aspect of this application. When the apparatus is the chip in the communications device, the processing unit may be a processor, and the transceiver unit may be an input/output interface, a pin, a circuit, or the like. The processing unit executes an instruction stored in a storage unit, so that the communications device is enabled to perform the method provided in the second aspect or the fourth aspect of this application. The storage unit may be a storage unit (for example, a register or a cache) in the chip, or may be a storage unit (for example, a read-only memory or a random access memory) that is in the communications device and that is located outside the chip.

A seventh aspect of this application provides a computer-readable storage medium. The computer-readable storage medium stores an instruction; and when the instruction is executed, a computer is enabled to perform the method for sending the uplink control information according to the first aspect or the third aspect of this application.

An eighth aspect of this application provides a computer-readable storage medium. The computer-readable storage medium stores an instruction; and when the instruction is executed, a computer is enabled to perform the method for receiving the uplink control information according to the second aspect or the fourth aspect of this application.

A ninth aspect of this application provides a computer program product. The computer program product includes computer program code; and when the computer program code is run by a transceiver unit, a processing unit, a transceiver, or a processor of a communications device (for example, a terminal device or a network device), the communications device is enabled to perform the method for sending the uplink control information according to the first aspect or the third aspect of this application.

A tenth aspect of this application provides a computer program product. The computer program product includes computer program code; and when the computer program code is run by a transceiver unit, a processing unit, a transceiver, or a processor of a communications device (for example, a terminal device or a network device), the communications device is enabled to perform the method for receiving the uplink control information according to the second aspect or the fourth aspect of this application.

An eleventh aspect of this application provides a network system. The network system includes the terminal device according to the ninth aspect or the tenth aspect of this application and the network device according to the ninth aspect or the tenth aspect of this application.

A method and an apparatus for sending or receiving uplink control information provided in this application include: receiving, by a terminal device, a first PDCCH and a second PDCCH that are sent by a network device, where the first PDCCH and the second PDCCH are transmitted in a same time unit, the first PDCCH indicates a first PUCCH resource and is used to schedule a first downlink TB, and the second PDCCH indicates a second PUCCH resource and is used to schedule a second downlink TB; and sending, by the terminal device on the first PUCCH resource, response information of the first downlink TB and response information of the second downlink TB to the network device. When one PUCCH fails to be received, the network device may obtain the response information of the two downlink TBs from the other PUCCH, thereby ensuring that HARQ feedback information of the downlink TBs is correctly received.

DESCRIPTION OF DRAWINGS

FIG. 1 is a schematic diagram of a network architecture to which an embodiment of this application is applicable;

FIG. 2 is a flowchart of a method for sending uplink control information according to Embodiment 1 of this application;

DESCRIPTION OF EMBODIMENTS

Figure 3:
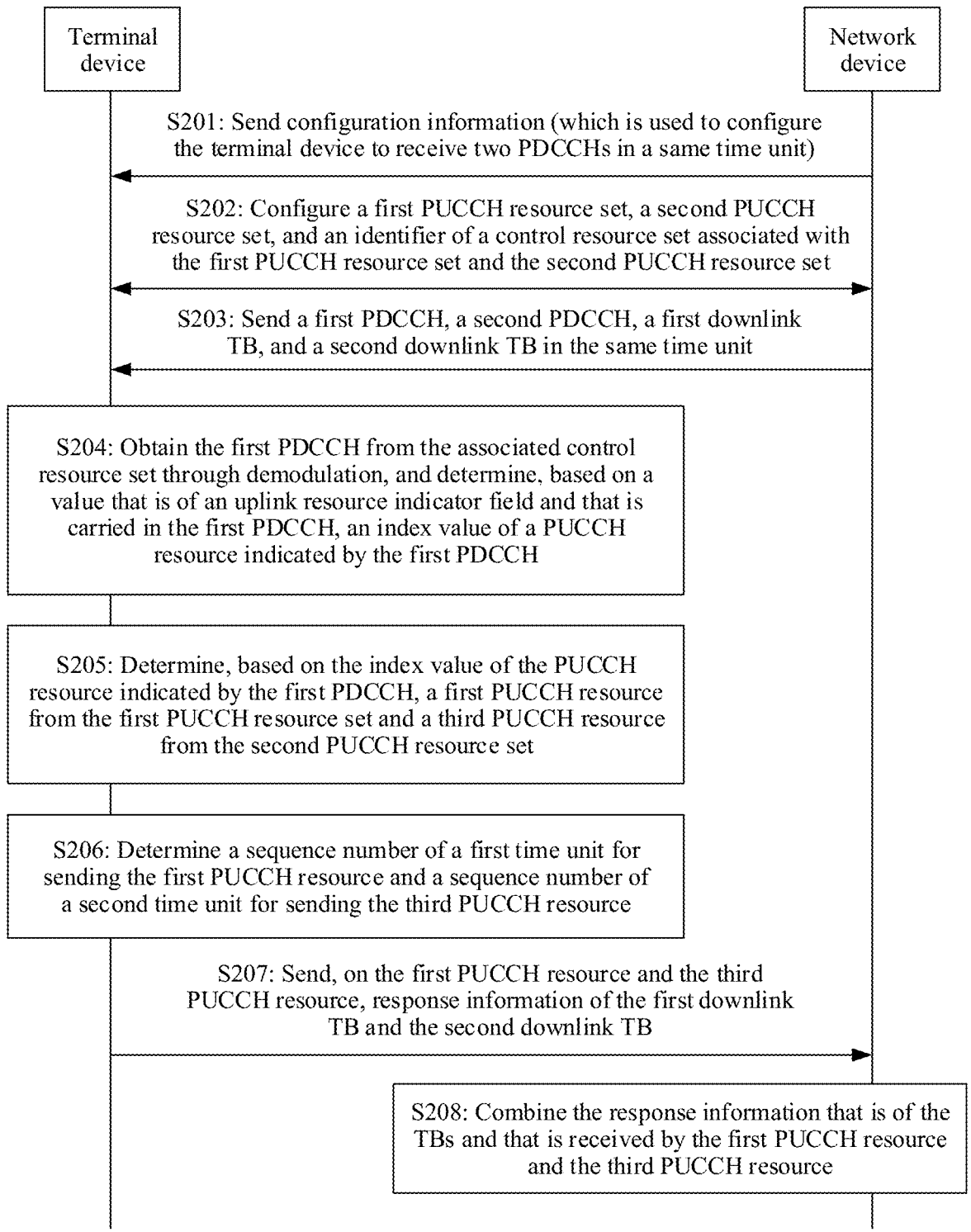
FIG. 3 is a signaling flowchart of a method for sending uplink control information according to Embodiment 2 of this application.

Embodiments of this application provide a method for sending and receiving uplink control information. The method in the embodiments of this application may be applied to a long term evolution (LTE) system, or may be applied to a 5G system. The 5G system is also referred to as a new wireless communications system, a new radio (NR) system, or a next-generation mobile communications system.

FIG. 1 is a schematic diagram of a network architecture to which an embodiment of this application is applicable. As shown in FIG. 1, the network architecture includes a terminal device and a base station. The base station may be a distributed base station. The distributed base station divides a conventional macro base station device into two function modules based on functions: a baseband unit (BBU) and a remote radio unit (RRU), where the BBU is configured to implement functions such as a baseband, main control, transmission, and a clock, and the RRU is configured to implement functions such as signal receiving and sending, power amplification, and filtering. During network deployment, the BBU, a core network, and a radio network control device are deployed in a central equipment room. The BBU is connected, by using an optical fiber, to the RRU deployed at a planned site, to implement network coverage. This saves a large quantity of equipment rooms required in common solutions, thereby reducing construction and maintenance costs, and improving efficiency. In the architecture shown in FIG. 1, the base station is the distributed base station. Certainly, in the embodiments of this application, a form of the base station is not limited, and the base station may alternatively be an integrated base station in which functions of the BBU and the RRU are integrated.

The terminal device may be a mobile phone or a computer, or may be a cellular phone, a cordless phone, a session initiation protocol (SIP) phone, a smartphone, a wireless local loop (WLL) station, a personal digital assistant (PDA), a computer, a laptop computer, a handheld communications device, a handheld computing device, a satellite wireless device, a wireless modem card, a television set-top box (STB), a vehicle-mounted device, a wearable device, a smart home device, another device configured to perform communication in a wireless system, or the like.

A higher carrier frequency (carrier frequency for short below) is introduced in the NR system, and a range of to-be-selected carrier frequencies includes a carrier near 30 GHz, a carrier near 60 GHz, and the like. Because fading of a high-carrier frequency signal in free space is greater, that is, a path loss of a high carrier frequency is relatively large, a coverage hole occurs in a cell covered by a base station having the high carrier frequency in the NR system. To meet a coverage requirement, the base station in the NR system needs to send a plurality of directional beams at different times in each sector, and align a main lobe direction of an antenna pattern with a target by using a beamforming technology, so as to ensure that the plurality of beams may cover the entire sector. An implementation of multi-beam transmission is a multi-antenna panel, and each antenna panel includes a plurality of antenna array elements. Different antenna panels may be relatively far away from each other in space, and different antenna panels may send different beams.

In the network architecture shown in FIG. 1, the base station uses two RRUs, each RRU is connected to an antenna panel, a signal of each RRU is sent by the connected antenna panel, and the RRU communicates with the BBU through fronthaul. Two antenna panels of the base station respectively send, to a terminal device in one slot, two PDCCHs and TBs scheduled by using the PDCCHs. After receiving the two PDCCHs and the TBs, the terminal device separately sends PUCCH signals to the two antenna panels. Each PUCCH carries HARQ feedback information of a TB sent by a corresponding antenna panel, the HARQ feedback information is an ACK message or a NACK message. After the two antenna panels respectively receive corresponding PUCCH signals, the RRU returns, through the fronthaul, the PUCCH signals to the BBU of the base station for processing.

Channel features of antenna ports of beams sent by different antenna panels are different from each other. Therefore, quasi co-location (QCL) information of reference signals corresponding to the antenna ports is different. A terminal device covered by the sector may simultaneously obtain, through detection, signals sent by one base station by using the plurality of beams.

An antenna port is a logical concept. One antenna port may be one physical transmit antenna, or may be a combination of a plurality of physical transmit antennas. In the two cases, a receiver of the terminal device does not distinguish signals that come from a same antenna port. Because from a perspective of the terminal, regardless of whether the antenna port is formed by a single physical transmit antenna or formed by combining the plurality of physical transmit antennas, a reference signal corresponding to the antenna port defines the antenna port, and the terminal device obtains channel estimation of the antenna port based on the reference signal. Each antenna port has an independent reference signal, and the terminal device needs to perform channel estimation and data demodulation based on the reference signal corresponding to the antenna port. Usually, a physical downlink control channel (PDCCH), a physical downlink shared channel (PDSCH), a physical uplink control channel (PUCCH), and a physical uplink shared channel (PUSCH) each have an independent reference signal, and reference signals of the channels correspond to different antenna ports.

Two signals (for example, two PDCCHs) are sent from two different antenna ports, and channels through which the two signals pass may have many same large-scale features, such as a Doppler frequency shift, an average delay, and a delay spread. Therefore, a concept of QCL is introduced for the antenna port. If different antenna ports are considered to be QCL, the receiver assumes that the channels corresponding to different antenna ports have some same large-scale features. In this way, the receiver performs channel estimation. A QCL relationship between different antenna ports is represented by using QCL information of reference signals corresponding to the antenna ports. QCL information of a reference signal indicates that the reference signal and another reference signal are OCL, that is, QCL types and corresponding QCL parameters of the reference signals are the same. The QCL types and parameters are shown in Table 1.

TABLE 1

| QCL type | QCL parameter |
| --- | --- |
| QCL-Type A | {Doppler frequency shift, Doppler spread, average delay, delay spread} |
| QCL-Type B | {Doppler frequency shift, Doppler spread} |
| QCL-Type C | {Average delay, Doppler spread} |
| QCL-Type D | {Spatial parameter} |

Usually, if physical antennas corresponding to two antenna ports are in a same location, the two antenna ports are QCL. However, if physical antennas corresponding to two antenna ports are in different locations, the two antenna ports are not QCL.

In the prior art, the terminal device carries, on each PUCCH, HARQ feedback information of only one TB. Because a coverage area of a single uplink beam in a sector is relatively small, and a path loss of a high carrier frequency is relatively large, if a signal transmitted by the uplink beam is blocked, an uplink beam link is likely to fail, and a corresponding antenna panel cannot receive the PUCCH. Consequently, the HARQ feedback information of the TB cannot be received.

Based on the foregoing network architecture, this application provides a method for sending uplink control information, to resolve problem, in the prior art, that a base station cannot receive HARQ feedback information that is of a TB and that is fed back by a terminal device. The following describes in detail, by using specific embodiments, technical solutions of this application and how to resolve the foregoing technical problem by using the technical solutions of this application. The following several example embodiments may be combined with each other, and a same or similar concept or process may not be described again in some embodiments. The following describes the embodiments of this application with reference to the accompanying drawings. The following embodiments may be used for multi-antenna panel transmission, or may be used for multi-TRP (Transmission Reception Point) transmission.

FIG. 2 is a flowchart of a method for sending uplink control information according to Embodiment 1 of this application. As shown in FIG. 2, the method provided in this embodiment includes the following steps.

Step S101: A terminal device receives a first PDCCH and a second PDCCH that are sent by a network device, where the first PDCCH and the second PDCCH are transmitted in a same time unit, the first PDCCH indicates a first PUCCH resource and is used to schedule a first downlink TB, and the second PDCCH indicates a second PUCCH resource and is used to schedule a second downlink TB.

In this embodiment of this application, the network device may be a base station, and the base station may use the distributed architecture shown in FIG. 1. The network device sends the first PDCCH and the second PDCCH to the terminal device in the same time unit. The first PDCCH and the second PDCCH are sent by using different beams. For example, the base station sends the first PDCCH to the terminal device by using a first beam, and simultaneously sends the second PDCCH to the terminal device by using a second beam.

The first PDCCH is used to indicate the first PUCCH resource and schedule the first downlink TB, and the second PDCCH is used to indicate the second PUCCH resource and schedule the second downlink TB. Therefore, the first downlink TB and the second downlink TB are also transmitted in the time unit. Therefore, the terminal device simultaneously receives the first PDCCH and the first downlink TB, and the second PDCCH and the second downlink TB. Before receiving the first PDCCH and the second PDCCH, the terminal device receives configuration information that is sent by the base station by using higher layer signaling. The configuration information is used to configure the terminal device to receive, in the same time unit, two PDCCHs used to schedule downlink data.

Optionally, the first PDCCH, the second PDCCH, the first downlink TB, and the second downlink TB are all transmitted on a same carrier.

Optionally, the first downlink TB and the second TB may be transmitted in the same time unit.

Optionally, scheduling of each of the TBs by using the PDCCHs is slot scheduling, that is, a mapping type of a PDSCH on which the TB is located is a PDSCH mapping type A.

Optionally, scheduling of each of the TBs by using the PDCCHs is non-slot scheduling, that is, a mapping type of a PDSCH on which the TB is located is a PDSCH mapping type B.

The time unit may be a subframe or a slot, or a mini-subframe or a mini-slot (for example, when scheduling of the PDSCH is non-slot scheduling), or may be a time-domain symbol, for example, an orthogonal frequency division multiplexing (OFDM) symbol.

For the PUCCH resource indicated by the PDCCH, the base station indicates an index number of the PUCCH resource by using an uplink resource indicator field (that is, a PUCCH resource indicator field (PUCCH resource indicator field)) in downlink control information (DCI) carried by the first PDCCH and the second PDCCH, and the terminal device confirms the PUCCH resource based on the index number and another parameter of the PUCCH resource. In an NR system, the base station configures a maximum of four PUCCH resource sets for the terminal device, each PUCCH resource set includes four to eight PUCCH resources, each PUCCH resource has a corresponding index number, and the index number of the PUCCH resource is configured by using higher layer signaling PUCCH-resource-index. In addition, the base station configures a related parameter of each PUCCH resource in the PUCCH resource set by using the higher layer signaling. The related parameter of the PUCCH resource includes: a start OFDM symbol index of the PUCCH resource, a quantity of OFDM symbols, a quantity of PRBs, and QCL information of a DMRS signal and another reference signal (such as an SRS or a CSI-RS) of the PUCCH.

In the prior art, the terminal device may decide, based on a quantity of bits of transmitted uplink control information (UCI), one PUCCH resource set in which the PUCCH resource is located. In addition, the base station indicates the index number of the PUCCH resource by using a PUCCH resource indicator field in DCI carried by the PDCCH. When there are more than four PUCCH resources in the PUCCH resource set, a value of each PUCCH resource indicator field can correspond to two PUCCH resources. In this case, the terminal device may select, by using another parameter (for example, a start control channel element (CCE) number value of the PDCCH), one PUCCH resource from the two PUCCH resources to transmit the UCI.

Optionally, if the value of each PUCCH resource indicator field corresponds to one PUCCH resource, the terminal device directly transmits the UCI based on the PUCCH resource corresponding to the value of the PUCCH resource indicator field.

Table 2 is a schematic diagram of a mapping relationship between a value of a PUCCH resource indicator field and a PUCCH resource in a PUCCH resource set. Table 2 is shown as follows:

TABLE 2

| PUCCH resource indicator | PUCCH resource | PUCCH resource |
| --- | --- | --- |
| '00' | {1st, 5th} resource in a PUCCH resource set provided by PUCCH-resource-index | {1st, 5th} resource in two PUCCH resource sets provided by PUCCH-resource-index |
| '01' | {2nd, 6th} resource in a PUCCH resource set provided by PUCCH-resource-index | {2nd, 6th} resource in two PUCCH resource sets provided by PUCCH-resource-index |
| '10' | {3rd, 7th} resource in a PUCCH resource set provided by PUCCH-resource-index | {3rd, 7th} resource in two PUCCH resource sets provided by PUCCH-resource-index |
| '11' | {4th, 8th} resource in a PUCCH resource set provided by PUCCH-resource-index | {4th, 8th} resource in two PUCCH resource sets provided by PUCCH-resource-index |

In Table 2, the first column is a value of a 2-bit PUCCH resource indicator field, and the 2-bit field may indicate four states in total: "00", "01", "10", and "11". In the second column, the value of each PUCCH resource indicator field corresponds to a PUCCH resource with a corresponding index number in one PUCCH resource set. In the third column, the value of each PUCCH resource indicator field corresponds to a PUCCH resource with a corresponding index number in two PUCCH resource sets, and QCL information of DMRS signals of PUCCH resources with a same index number in the two PUCCH resource sets is different, that is, uplink beams for sending the two PUCCHs are different.

In this embodiment, the first PDCCH and the second PDCCH may indicate PUCCH resources with corresponding index numbers in one PUCCH resource set, or may indicate PUCCH resources with a same index number in two PUCCH resource sets. For example, in addition to the first PUCCH resource, the first PDCCH may further indicate a third PUCCH resource. The first PUCCH resource and the third PUCCH resource respectively come from two PUCCH resource sets. Similarly, in addition to the second PUCCH resource, the second PDCCH may further indicate a fourth PUCCH resource. The second PUCCH resource and the fourth PUCCH resource respectively come from two PUCCH resource sets.

Optionally, in this embodiment, the first PUCCH resource may include PUCCH resources transmitted in different time units. For example, the PUCCH resources carry the same UCI, that is, a same PUCCH is repeatedly sent in different time units. Similarly, the foregoing second PUCCH resource and third PUCCH resource may alternatively include PUCCH resources transmitted in different time units.

It should be noted that first, second, third, and fourth in the embodiments of this application are merely used to distinguish between different data, and do not indicate a sequence relationship.

Step S102: The terminal device sends, on the first PUCCH resource, response information of the first downlink TB and response information of the second downlink TB to the network device.

Response information of a TB is HARQ feedback information of the TB, and the HARQ feedback information may be an ACK message or a NACK message.

Optionally, the terminal device sends, on the second PUCCH resource, the response information of the first downlink TB and/or the response information of the second downlink TB. The terminal device sends the response information of the TBs on the first PUCCH resource and the second PUCCH resource by using two different beams. For example, when the network device sends the first PDCCH by using the first beam and sends the second PDCCH by using the second beam, the terminal device may send, on the first PUCCH resource by using the first beam, the response information of the first downlink TB and the response information of the second downlink TB to the network device, and send, on the second PUCCH resource by using the second beam, the response information of the first downlink TB and/or the response information of the second downlink TB to the network device. The first PUCCH resource and the second PUCCH resource may belong to a same PUCCH resource set, or may belong to different PUCCH resource sets. In the manner, each PDCCH indicates one PUCCH resource, to feed back response information of a TB.

Correspondingly, the terminal device needs to determine the first PUCCH resource based on the first PDCCH, and determine the second PUCCH resource based on the second PDCCH. The terminal device may determine the first PUCCH resource and the second PUCCH resource by using an existing method. Using the first PUCCH resource as an example, the terminal device first obtains through demodulation the first PDCCH, decides, based on a quantity of bits of UCI carried on the first PUCCH, a PUCCH resource set in which the first PUCCH resource is located, then obtains an index number of the first PUCCH resource based on the value of the PUCCH resource indicator field in the DCI carried by the first PDCCH, and obtains the first PUCCH resource based on the index number of the first PUCCH resource and the PUCCH resource set in which the first PUCCH resource is located (or may further need to obtain the first PUCCH resource based on another parameter). Similarly, the second PUCCH resource may be obtained.

In addition to determining the first PUCCH resource and the second PUCCH resource, the terminal device further needs to determine sequence numbers of time units for sending the first PUCCH resource and the second PUCCH resource. Then, the terminal device sends the response information to the network device on the first PUCCH resource and the second PUCCH resource based on the determined sequence numbers of the time units. The sequence number of the time unit for sending the first PUCCH resource and the sequence number of the time unit for sending the second PUCCH resource may be the same or may be different. The terminal device may determine, by using an existing solution, the sequence number of the time unit for sending the first PUCCH resource and the sequence number of the time unit for sending the second PUCCH resource, or may use the method provided in this embodiment of this application. The method provided in this embodiment of this application is as follows.

The sequence number of the time unit for sending the first PUCCH resource is used as an example. Optionally, the terminal device determines, according to the following formula, the sequence number of the time unit for sending the first PUCCH resource:

$n'=n+k_1+k_{offset}$, where n' is the sequence number of the time unit for sending the first PUCCH resource, n is a sequence number of a time unit for receiving the first PDCCH, $k_{offset}$ is an offset factor corresponding to the PUCCH resource set in which the first PUCCH resource is located, and $k_1$ is first time information. The first time information may be a value of a PDSCH-to-feedback timing indicator (PDSCH-to-HARQ-feedback timing indicator) field in the DCI carried by the first PDCCH. The PDSCH-to-feedback timing indicator field indicates an interval between response information of a TB carried on the PDSCH and a receiving time unit of the TB, and the interval (that is, $k_1$) is a quantity of time units. In this embodiment of this application, one offset factor needs to be configured for each PUCCH resource set, and the offset factor may be included in configuration information of the PUCCH resource set.

Optionally, the terminal device sends, on the third PUCCH resource, the response information of the first downlink TB and/or the response information of the second downlink TB, and the third PUCCH resource is indicated by the first PDCCH resource. The terminal device sends the response information of the TBs on the first PUCCH resource and the third PUCCH resource by using two different beams. For example, when the network device sends the first PDCCH by using the first beam and sends the second PDCCH by using the second beam, the terminal device may send, on the first PUCCH resource by using the first beam, the response information of the first downlink TB and the response information of the second downlink TB to the network device, and send, on the third PUCCH resource by using the second beam, the response information of the first downlink TB and/or the response information of the second downlink TB to the network device. Index numbers of the first PUCCH resource and the third PUCCH resource are the same, while the first PUCCH resource and the third PUCCH resource belong to different control resource sets. In the manner, the network device indicates two PUCCH resources by using one PDCCH, to feed back response information of a TB.

Correspondingly, the terminal device determines the first PUCCH resource and the third PUCCH resource based on information that is about the uplink resource indicator field and that is carried in the first PDCCH and configuration information of the two PUCCH resource sets configured by the network device by using the higher layer signaling.

Optionally, the network device needs to configure the two PUCCH resource sets for the terminal device in advance by using the higher layer signaling. That the terminal device determines the first PUCCH resource and the third PUCCH resource based on information that is about the uplink resource indicator field and that is carried in the first PDCCH and configuration information of the two PUCCH resource sets configured by the network device is specifically: obtaining through demodulation, based on a control resource set (CORESET) corresponding to an identifier (for example, CORESET-ID) of the control resource set associated with the two PUCCH resource sets, the first PDCCH from the control resource set, where the identifier of the control resource set is configured by the network device by using the higher layer signaling; determining, based on a value that is of the uplink resource indicator field and that is carried in the first PDCCH, an index value of a PUCCH resource indicated by the first PDCCH; and determining the first PUCCH resource and the third PUCCH resource from the two PUCCH resource sets based on the index value of the PUCCH resource indicated by the first PDCCH.

For example, if the network device configures a first PUCCH resource set and a second PUCCH resource set, the terminal device determines, based on the index value of the PUCCH resource indicated by the first PDCCH, the first PUCCH resource from the first PUCCH resource set, and determines, based on the index value of the PUCCH resource indicated by the first PDCCH, the third PUCCH resource from the second PUCCH resource set.

Optionally, the first PDCCH carries second indication information, and the second indication information is used to indicate whether all PUCCH resources (including the first PUCCH resource and the third PUCCH resource) indicated by the first PDCCH are used to feed back response information of a downlink TB. The terminal device determines, based on the second indication information carried in the first PDCCH, whether the response information of the downlink TB is fed back on both the first PUCCH resource and the third PUCCH resource. When the second indication information indicates that all the PUCCH resources indicated by the first PDCCH are used to feed back the response information of the downlink TB, the terminal device sends the response information of the downlink TB to the network device by using the first PUCCH resource and the third PUCCH resource.

Certainly, the first PDCCH may not carry the second indication information. The network device and the terminal device pre-agree on whether all the PUCCH resources indicated by the first PDCCH are used to feed back the response information of the downlink TB, or the network device indicates, by using the higher layer signaling, whether all the PUCCH resources indicated by the first PDCCH of the terminal device are used to feed back the response information of the downlink TB.

Optionally, the terminal device further determines, based on the first time information carried in the first PDCCH, the sequence number of the time unit for receiving the first PDCCH, and the configuration information of the two PUCCH resource sets configured by the network device by using the higher layer signaling, sequence numbers of time units for sending the first PUCCH resource and the third PUCCH resource, and then sends, on the first PUCCH resource and the third PUCCH resource, the response information to the network device based on the sequence numbers of the time units. The first time information may be the value of the PDSCH-to-feedback timing indicator field in the DCI carried by the first PDCCH.

Optionally, the terminal device determines, according to the following formula, a sequence number of a transmission unit for sending a PUCCH resource:

$n'=n+k_1+k_{offset}$, where n' is the sequence number of the transmission unit for sending the PUCCH resource, n is a sequence number of a transmission unit for receiving a PDCCH, $k_{offset}$ is the offset factor, and $k_1$ is the first time information.

Optionally, before step S102 is performed, the terminal device determines, based on the first indication information corresponding to each PDCCH, response information carried on a PUCCH resource indicated by the PDCCH, where the first indication information is used to indicate that the response information carried on the PUCCH resource indicated by the PDCCH is response information of a downlink TB scheduled by using the PDCCH or response information of downlink TBs scheduled by using two PDCCHs (the first PDCCH and the second PDCCH). The first indication information is carried in downlink control information DCI carried by the PDCCH.

In this embodiment of this application, a 1-bit information field may be added to the DCI to carry the first indication information. For example, the 1-bit information field is introduced to a DCI information field of the first PDCCH and the second PDCCH, and the information field is used to carry the first indication information. When a value of the information field is "1", the information field is used to indicate that the response information of the TB carried on the PUCCH resource indicated by the PDCCH is the response information of the downlink TB scheduled by using the PDCCH. When a value of the information field is "0", the information field is used to indicate that the response information of the TB carried on the PUCCH resource indicated by the PDCCH is the response information of the downlink TBs scheduled by using the two PDCCHs (the first PDCCH and the second PDCCH). Certainly, the information field herein is merely an example, and "1" may also be used to indicate that the response information of the TB carried on the PUCCH resource indicated by the PDCCH is the response information of the downlink TBs scheduled by using the two PDCCHs (the first PDCCH and the second PDCCH), and "0" is used to indicate that the response information of the TB carried on the PUCCH resource indicated by the PDCCH is the response information of the downlink TB scheduled by using the PDCCH. Alternatively, the first indication information is carried by using a plurality of bits in the DCI.

For example, if the value of the information field that is in the DCI carried by the first PDCCH and that is used to carry the first indication information is "0", and the value of the information field that is in the DCI carried by the second PDCCH and that is used to carry the first indication information is "1", the terminal device determines, based on the first indication information carried by the first PDCCH, that the response information carried on the first PUCCH resource indicated by the first PDCCH is the response information of the first downlink TB scheduled by using the first PDCCH and the response information of the second downlink TB scheduled by using the second PDCCH; and determines, based on the first indication information carried in the second PDCCH, that the response information of the downlink TB carried on the second PUCCH resource indicated by the second PDCCH is the response information of the second downlink TB scheduled by using the second PDCCH. Alternatively, if the value of the information field that is in the DCI carried by the first PDCCH and the second PDCCH and that is used to carry the first indication information is "0", the terminal device determines, based on the first indication information carried by the first PDCCH and the first indication information carried by the second PDCCH, that the response information of the TB carried by the first PUCCH resource is the same as the response information of the TB carried by the second PUCCH resource. The two pieces of response information are respectively the response information of the first downlink TB scheduled by using the first PDCCH and the response information of the second downlink TB scheduled by using the second PDCCH.

Optionally, before step S102 is performed, the terminal device determines, based on first indication information corresponding to each PDCCH, response information carried on a PUCCH resource indicated by the PDCCH, where the first indication information is used to indicate that the response information carried on the PUCCH resource indicated by the PDCCH transmitted in a control resource set to which the PDCCH belongs is response information of a downlink TB scheduled by using the transmitted PDCCH or response information of downlink TBs scheduled by using two PDCCHs, and the first indication information is carried in the higher layer signaling. The higher layer signaling may be existing signaling, or may be higher layer signaling newly introduced to this embodiment of this application. For example, higher layer signaling PUCCH-Resource-Repetition is introduced to this embodiment of this application to carry the first indication information.

Specifically, the first PDCCH and the second PDCCH are transmitted in two different control resource sets. The network device divides one or more control resource sets for each terminal device, and sends a PDCCH to the terminal device on any control resource set corresponding to the terminal device. The control resource set is formed by a physical resource block (PRB) in frequency domain, and formed by consecutive OFDM symbols in time domain. The control resource set is located in a downlink bandwidth part (BWP) of the terminal device.

When configuring the two CORESETs, the network device introduces higher layer signaling. When the higher layer signaling is "0" or "Disabled", the response information of the downlink TB carried on the PUCCH resource indicated by the PDCCH transmitted in the CORESETs is HARQ feedback information of the downlink TB scheduled by using the PDCCH. When the higher layer signaling is "1" or "Enabled", the response information of the downlink TB carried on the PUCCH resource indicated by the PDCCH transmitted in the CORESETs is response information of two downlink TBs scheduled by using the two PDCCHs. The higher layer signaling herein is merely an example for description. Alternatively, "0" or "Disabled" may be used to indicate that the response information of the downlink TB carried on the PUCCH resource indicated by the PDCCH is response information of two downlink TBs scheduled by using the two PDCCHs, and "1" or "Enabled" is used to indicate that the response information of the downlink TB carried on the PUCCH resource indicated by the PDCCH is HARQ feedback information of the downlink TB scheduled by using the PDCCH. Alternatively, the higher layer signaling includes a plurality of bits.

In this embodiment, if receiving the first indication information, the terminal device determines, based on the first indication information, the response information of the downlink TB carried on each PUCCH resource. If the terminal device does not receive the first indication information, the terminal device may decide the response information carried on each PUCCH resource, provided that at least one PUCCH resource carries the response information of the TBs scheduled by using the two PDCCHs.

After receiving the response information of the downlink TBs carried on the first PUCCH resource and the second PUCCH resource, the network device performs combination processing on the response information carried on the two PUCCH resources, to obtain a diversity gain and a combination gain, thereby improving reliability and coverage of PUCCH transmission. In addition, when an uplink beam of an antenna panel fails, the base station may still obtain HARQ feedback information of two TBs from the other antenna panel, thereby ensuring that the base station can receive the HARQ feedback information of the TBs.

In this embodiment, the terminal device receives the first PDCCH and the second PDCCH that are sent by the network device, where the first PDCCH and the second PDCCH are transmitted in the same time unit, the first PDCCH indicates the first PUCCH resource and is used to schedule the first downlink TB, and the second PDCCH indicates the second PUCCH resource and is used to schedule the second downlink TB. The terminal device sends, on the first PUCCH resource, the response information of the first downlink TB and the response information of the second downlink TB to the network device. When one PUCCH fails to be received, the network device may obtain the response information of the two downlink TBs from the other PUCCH, thereby ensuring that the HARQ feedback information of the downlink TBs is correctly received.

Based on Embodiment 1, FIG. 3 is a signaling flowchart of a method for sending uplink control information according to Embodiment 2 of this application. In this embodiment, a network device indicates two PUCCH resources by using one PDCCH. As shown in FIG. 3, the method provided in this embodiment includes the following steps.

Step S201: The network device sends configuration information to a terminal device, where the configuration information is used to configure the terminal device to receive two PDCCHs in a same time unit.

Step S202: The network device configures, for the terminal device, a first PUCCH resource set, a second PUCCH resource set, and an identifier of a control resource set associated with the first PUCCH resource set and the second PUCCH resource set.

The two PUCCH resource sets are associated with one control resource set, and the network device configures, by using higher layer signaling, the first PUCCH resource set, the second PUCCH resource set, and the identifier of the control resource sets associated with the first PUCCH resource set and the second PUCCH resource set. Configuration information of the first PUCCH resource set includes a first offset factor, and configuration information of the second PUCCH resource set includes a second offset factor.

Step S203: The network device sends, to the terminal device in the same time unit, a first PDCCH, a second PDCCH, a first downlink TB scheduled by using the first PDCCH, and a second downlink TB scheduled by using the second PDCCH.

The first PDCCH and the second PDCCH are sent by using different beams. The first PDCCH is transmitted in the control resource set associated with the first PUCCH resource set and the second PUCCH resource set, and the second PDCCH is transmitted in another control resource set. Certainly, the second PDCCH may also be transmitted in the control resource set associated with the first PUCCH resource set and the second PUCCH resource set, and the first PDCCH is transmitted in another control resource set. The first PDCCH indicates a first PUCCH resource and a third PUCCH resource, and the second PDCCH does not indicate a PUCCH resource or indicates a second PUCCH resource.

In this embodiment, DCI carried by the first PDCCH carries first indication information, and the first indication information is used to indicate that response information of TBs carried on the first PUCCH resource and the third PUCCH resource is response information of the first downlink TB and the second downlink TB.

Step S204: The terminal device obtains the first PDCCH from the associated control resource set through demodulation, and determines, based on a value that is of an uplink resource indicator field and that is carried in the first PDCCH, an index value of a PUCCH resource indicated by the first PDCCH.

In addition, the first time information is a value $k_1$ of a PDSCH-to-feedback timing indicator field in the DCI carried by the first PDCCH.

Step S205: The terminal device determines, based on the index value of the PUCCH resource indicated by the first PDCCH, the first PUCCH resource from the first PUCCH resource set and the third PUCCH resource from the second PUCCH resource set.

Step S206: The terminal device determines a sequence number of a first time unit for sending the first PUCCH resource and a sequence number of a second time unit for sending the third PUCCH resource.

The terminal device obtains the first offset factor from the first PUCCH resource set, obtains the second offset from the second PUCCH resource set, and calculates sequence numbers of time units of the first PUCCH resource and the third PUCCH resource according to a formula $n'=n+k_1+k_{offset}$.

Step S207: The terminal device sends, on the first PUCCH resource and the third PUCCH resource, response information of the first downlink TB and the second downlink TB to the network device.

In this embodiment, the network device indicates, in the first PDCCH, the terminal device to feed back, on the first PUCCH resource and the third PUCCH resource, the response information of the downlink TBs scheduled by using the two PDCCHs. Therefore, the terminal device sends, on the first PUCCH resource and the third PUCCH resource, the response information of the first downlink TB and the second downlink TB to the network device.

Step S208: The network device combines the response information that is of the TBs and that is received by the first PUCCH resource and the third PUCCH resource.

Figure 4:
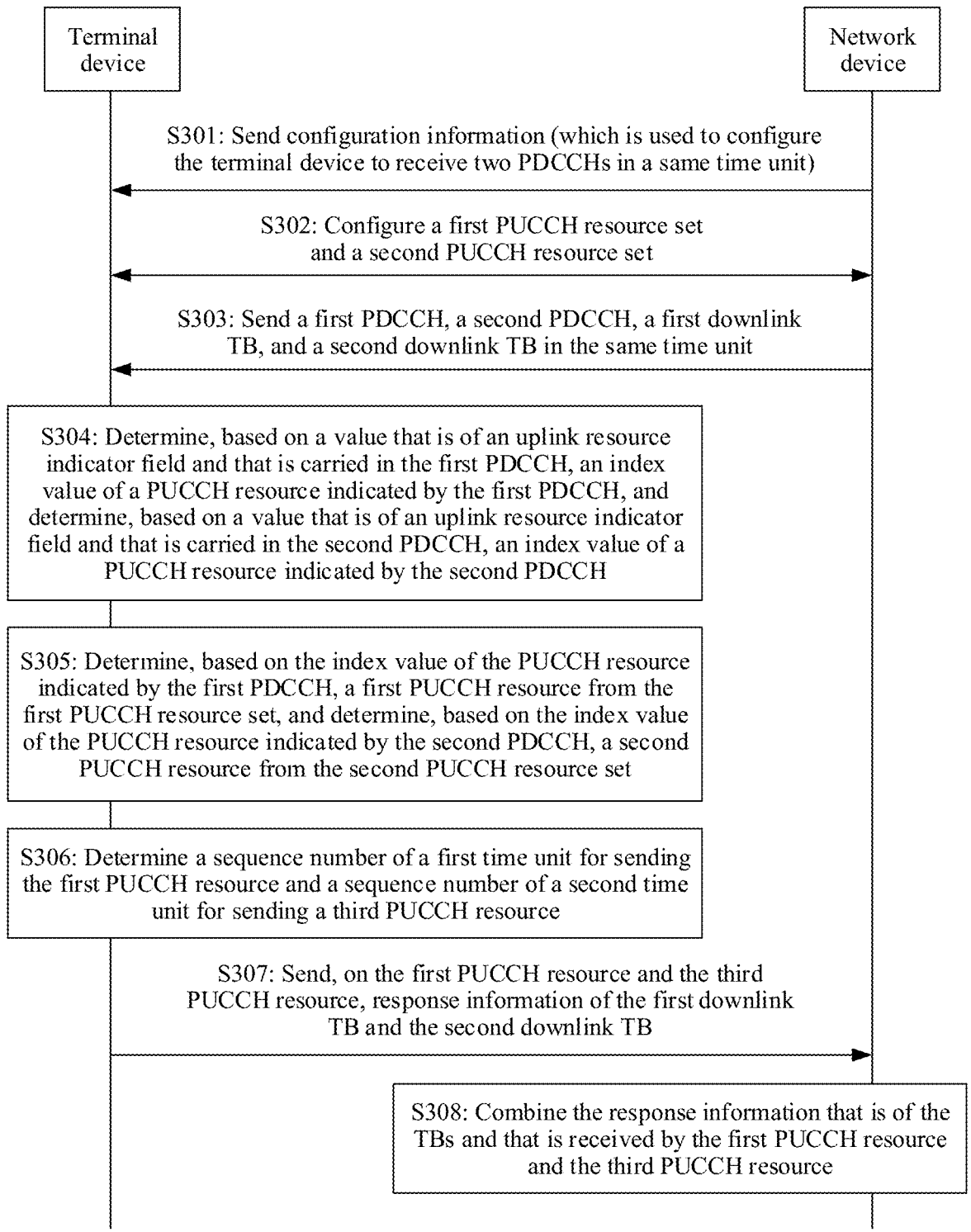
FIG. 4 is a signaling flowchart of a method for sending uplink control information according to Embodiment 3 of this application.

Based on Embodiment 1, FIG. 4 is a signaling flowchart of a method for sending uplink control information according to Embodiment 3 of this application. In this embodiment, a network device indicates two PUCCH resources by using one PDCCH. As shown in FIG. 4, the method provided in this embodiment includes the following steps.

Step S301: The network device sends configuration information to a terminal device, where the configuration information is used to configure the terminal device to receive two PDCCHs in a same time unit.

Step S302: The network device configures a first PUCCH resource set and a second PUCCH resource set for the terminal device.

The network device also configures, by using higher layer signaling, an identifier of a control resource set associated with each PUCCH resource set, and a PUCCH resource indicated by a PDCCH transmitted in the control resource set corresponding to the identifier of the control resource set belongs to the associated PUCCH resource set.

The network device configures the first PUCCH resource set and the second PUCCH resource set by using the higher layer signaling. Configuration information of the first PUCCH resource set includes a first offset factor, and configuration information of the second PUCCH resource set includes a second offset factor.

Step S303: The network device sends, to the terminal device in the same time unit, a first PDCCH, a second PDCCH, a first downlink TB scheduled by using the first PDCCH, and a second downlink TB scheduled by using the second PDCCH.

The first PDCCH and the second PDCCH are sent by using different beams, and the first PDCCH and the second PDCCH are transmitted in different control resource sets. The first PDCCH indicates a first PUCCH resource, and the second PDCCH indicates a second PUCCH resource.

In this embodiment, DCI carried by the first PDCCH carries first indication information, and the first indication information is used to indicate that response information of a TB carried on the first PUCCH resource is response information of the first downlink TB and the second downlink TB. DCI carried by the second PDCCH carries the first indication information, and the first indication information is used to indicate that response information of a downlink TB carried on the second PUCCH resource is response information of the second downlink TB.

Step S304: The terminal device determines, based on a value that is of an uplink resource indicator field and that is carried in the first PDCCH, an index value of a PUCCH resource indicated by the first PDCCH, and determines, based on a value that is of an uplink resource indicator field and that is carried in the second PDCCH, an index value of a PUCCH resource indicated by the second PDCCH.

In addition, the first time information is a value $k_1$ of a PDSCH-to-feedback timing indicator field in the DCI carried by the first PDCCH and the second PDCCH.

Step S305: The terminal device determines, based on the index value of the PUCCH resource indicated by the first PDCCH, the first PUCCH resource from the first PUCCH resource set, and determines, based on the index value of the PUCCH resource indicated by the second PDCCH, the second PUCCH resource from the second PUCCH resource set.

Step S306: The terminal device determines a sequence number of a first time unit for sending the first PUCCH resource and a sequence number of a second time unit for sending the second PUCCH resource.

The terminal device obtains the first offset factor from the first PUCCH resource set, obtains the second offset from the second PUCCH resource set, and calculates sequence numbers of time units of the first PUCCH resource and the second PUCCH resource according to a formula $n'=n+k_1+k_{offset}$.

Step S307: The terminal device sends, on the first PUCCH resource, response information of the first downlink TB and the second downlink TB to the network device, and sends, on the second PUCCH resource, response information of the second downlink TB to the network device.

In this embodiment, the network device indicates, in the first PDCCH, that the response information of the downlink TBs scheduled by using the two PDCCHs is fed back on the first PUCCH resource. Therefore, the terminal device sends, on the first PUCCH resource, the response information of the first downlink TB and the second downlink TB to the network device. The network device indicates, in the second PDCCH, that the response information of the downlink TB scheduled by using the second PDCCH is fed back on the second PUCCH resource. Therefore, the terminal device sends, on the second PUCCH resource, the response information of the second downlink TB to the network device.

Step S308: The network device combines response information that is of TBs and that is received by the first PUCCH resource and a third PUCCH resource.

In the foregoing embodiment, an example in which the network device sends two PDCCHs to the terminal device in a same time unit is used. Certainly, the method in this embodiment is not limited to the two PDCCHs, and the network device may send more PDCCHs to the terminal device in a same time unit. For example, the network device simultaneously sends three PDCCHs or four PDCCHs to the terminal device in a same time unit, and a plurality of PDCCHs are sent by using different beams. Correspondingly, the terminal device may alternatively send, to the network device on each PUCCH resource, response information of downlink TBs scheduled by using more PDCCHs. For example, the terminal device sends, to the network device on each PUCCH, response information of downlink TBs scheduled by using three PDCCHs, or send, to the network device on each PUCCH, response information of downlink TBs scheduled by using the four PDCCHs. An implementation of the plurality of (more than two) PDCCHs is similar to that of the foregoing two PDCCHs, and details are not described herein again.

Figure 5:
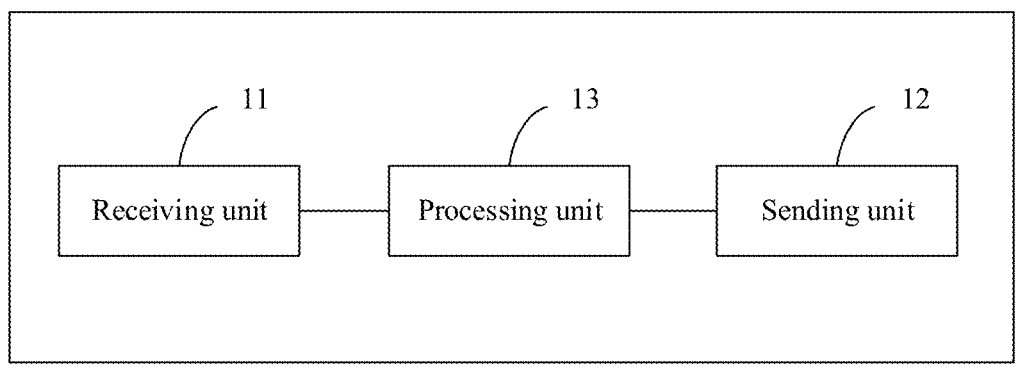
FIG. 5 is a schematic structural diagram of an apparatus for sending uplink control information according to Embodiment 4 of the present invention.

FIG. 5 is a schematic structural diagram of an apparatus for sending uplink control information according to Embodiment 4 of the present invention. The apparatus in this embodiment may be applied to a terminal device. As shown in FIG. 5, the apparatus provided in this embodiment includes:

a receiving unit 11, configured to receive a first physical downlink control channel PDCCH and a second PDCCH that are sent by a network device, where the first PDCCH and the second PDCCH are transmitted in a same time unit, the first PDCCH indicates a first physical uplink control channel PUCCH resource and is used to schedule a first downlink transport block TB, and the second PDCCH indicates a second PUCCH resource and is used to schedule a second downlink TB; and a sending unit 12, configured to send, on the first PUCCH resource, response information of the first downlink TB and response information of the second downlink TB to the network device.

Optionally, the sending unit 12 is further configured to send, on the second PUCCH resource, the response information of the first downlink TB and/or the response information of the second downlink TB.

Optionally, the apparatus further includes a processing unit 13, where the processing unit 13 is configured to determine, based on first indication information corresponding to each PDCCH, response information carried on a PUCCH resource indicated by the PDCCH, where the first indication information is used to indicate that the response information carried on the PUCCH resource indicated by the PDCCH is response information of a downlink TB scheduled by using the PDCCH or response information of downlink TBs scheduled by using two PDCCHs, and the first indication information is carried in downlink control information DCI carried by the PDCCH, or the processing unit 13 is configured to determine, based on first indication information corresponding to each PDCCH, response information carried on a PUCCH resource indicated by the PDCCH, where the first indication information is used to indicate that the response information carried on the PUCCH resource indicated by the PDCCH transmitted in a control resource set to which the PDCCH belongs is response information of a downlink TB scheduled by using the transmitted PDCCH or response information of downlink TBs scheduled by using two PDCCHs, and the first indication information is carried in higher layer signaling.

Optionally, the first PDCCH further indicates a third PUCCH resource, and the sending unit 12 is further configured to send, on the third PUCCH resource, the response information of the first downlink TB and/or the response information of the second downlink TB.

Optionally, the processing unit 13 is further configured to determine the first PUCCH resource and the third PUCCH resource based on information that is about an uplink resource indicator field and that is carried in the first PDCCH and configuration information of two PUCCH resource sets configured by the network device by using the higher layer signaling.

Optionally, the processing unit 13 is specifically configured to:

obtain through demodulation, based on a control resource set corresponding to an identifier of the control resource set associated with the two PUCCH resource sets, the first PDCCH resource from the control resource set, where the identifier of the control resource set is configured by the network device by using the higher layer signaling;

determine, based on a value that is of the uplink resource indicator field and that is carried in the first PDCCH, an index value of a PUCCH resource indicated by the first PDCCH; and determine the first PUCCH resource and the third PUCCH resource from the two PUCCH resource sets based on the index value of the PUCCH resource indicated by the first PDCCH.

Optionally, the processing unit 13 is further configured to determine, based on second indication information carried in the first PDCCH, that response information of a downlink TB is fed back on both the first PUCCH resource and the third PUCCH resource, where the second indication information is used to indicate whether all PUCCH resources indicated by the first PDCCH are used to feed back the response information of the downlink TB.

Optionally, the processing unit 13 is further configured to determine, based on the first time information carried on the first PDCCH, a sequence number of a time unit for receiving the first PDCCH, and configuration information of the two PUCCH resource sets configured by the network device by using the higher layer signaling, sequence numbers of time units for sending the first PUCCH resource and the third PUCCH resource. The sending unit 12 is specifically configured to send, on the first PUCCH resource and the third PUCCH resource, the response information to the network device based on the sequence numbers of the time units.

Optionally, configuration information of each PUCCH resource set includes an offset factor, and that the processing unit 13 determines, based on first time information carried in the first PDCCH, a sequence number of a time unit for receiving the first PDCCH, and configuration information of the two PUCCH resource sets configured by the network device by using the higher layer signaling, sequence numbers of time units for sending the first PUCCH resource and the third PUCCH resource includes:

determining, according to the following formula, a sequence number of a transmission unit for sending the PUCCH resource:

$n'=n+k_1+k_{offset}$, where n' is the sequence number of the transmission unit for sending the PUCCH resource, n is a sequence number of a transmission unit for receiving the PDCCH, $k_{offset}$ is the offset factor, and $k_1$ is the first time information.

The apparatus provided in this embodiment may be configured to perform the method performed by the terminal device in Embodiment 1 to Embodiment 3. Specific implementations and technical effects are similar, and details are not described herein again.

Figure 6:
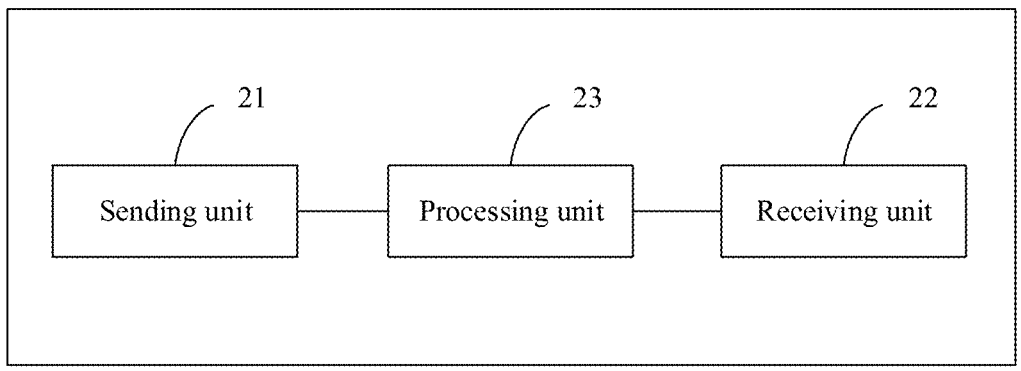
FIG. 6 is a schematic structural diagram of an apparatus for receiving uplink control information according to Embodiment 5 of this application.

FIG. 6 is a schematic structural diagram of an apparatus for receiving uplink control information according to Embodiment 5 of this application. The apparatus in this embodiment may be applied to a network device. As shown in FIG. 6, the apparatus provided in this embodiment includes:

a sending unit 21, configured to send a first physical downlink control channel PDCCH and a second PDCCH to a terminal device, where the first PDCCH and the second PDCCH are transmitted in a same time unit, the first PDCCH indicates a first physical uplink control channel PUCCH resource and is used to schedule a first downlink transport block TB, and the second PDCCH indicates a second PUCCH resource and is used to schedule a second downlink TB; and a receiving unit 22, configured to receive response information of the first downlink TB and response information of the second downlink TB that are sent by the terminal device on the first PUCCH resource.

Optionally, the receiving unit 22 is further configured to receive the response information of the first downlink TB and/or the response information of the second downlink TB that are/is sent by the terminal device on the second PUCCH resource.

Optionally, downlink control information DCI carried by each PDCCH includes first indication information, and the first indication information is used to indicate that response information carried on a PUCCH resource indicated by the PDCCH is response information of a downlink TB scheduled by using the PDCCH or response information of downlink TBs scheduled by using two PDCCHs.

Optionally, the sending unit 21 is further configured to send, to the terminal device by using higher layer signaling, first indication information corresponding to each PDCCH, where the first indication information is used to indicate that response information carried on a PUCCH resource indicated by the PDCCH transmitted in a control resource set to which the PDCCH belongs is response information of a downlink TB scheduled by using the transmitted PDCCH or response information of downlink TBs scheduled by using two PDCCHs.

Optionally, the first PDCCH further indicates a third PUCCH resource, and the receiving unit 22 is further configured to receive the response information of the first downlink TB and/or the response information of the second downlink TB that are/is sent by the terminal device on the third PUCCH resource.

Optionally, the sending unit 21 is further configured to send configuration information of two PUCCH resource sets to the terminal device by using the higher layer signaling, where the configuration information of the two PUCCH resource sets is used to determine the first PUCCH resource, the third PUCCH resource, and sequence numbers of time units for sending the first PUCCH resource and the third PUCCH resource.

Optionally, the sending unit 21 is further configured to send, to the terminal device by using the higher layer signaling, an identifier of a control resource set associated with the two PUCCH resource sets, where the identifier of the control resource set is used by the terminal device to determine the first PUCCH resource and the second PUCCH resource.

Optionally, the first PDCCH further carries second indication information, and the second indication information is used to indicate whether all PUCCH resources indicated by the first PDCCH are used to feed back response information of a downlink TB.

Optionally, configuration information of each PUCCH resource set includes an offset factor, and the offset factor is used by the terminal device to determine the sequence number of the time unit for sending the first PUCCH resource or the third PUCCH resource.

The apparatus provided in this embodiment may be configured to perform the method performed by the network device in Embodiment 1 to Embodiment 3. Specific implementations and technical effects are similar, and details are not described herein again.

Figure 7:
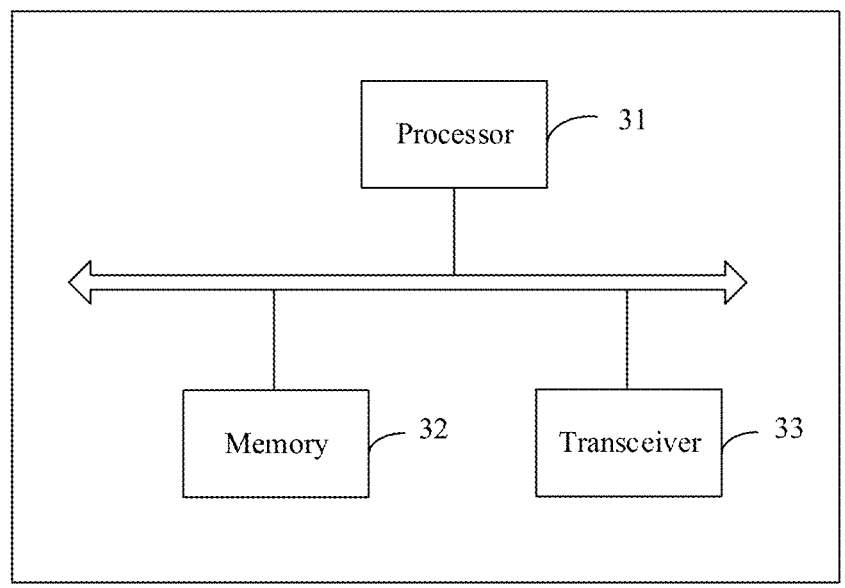
FIG. 7 is a schematic structural diagram of an apparatus for sending uplink control information according to Embodiment 6 of this application.

FIG. 7 is a schematic structural diagram of an apparatus for sending uplink control information according to Embodiment 6 of this application. The apparatus in this embodiment may be applied to a terminal device. As shown in FIG. 7, the apparatus provided in this embodiment includes a processor 31, a memory 32, and a transceiver 33. The memory 32 is configured to store an instruction, the transceiver 33 is configured to communicate with another device, and the processor 31 is configured to execute the instruction stored in the memory 32, so that the apparatus is enabled to perform the method performed by the terminal device in Embodiment 1 to Embodiment 3 of this application. Specific implementations and technical effects are similar, and details are not described herein again.

Figure 8:
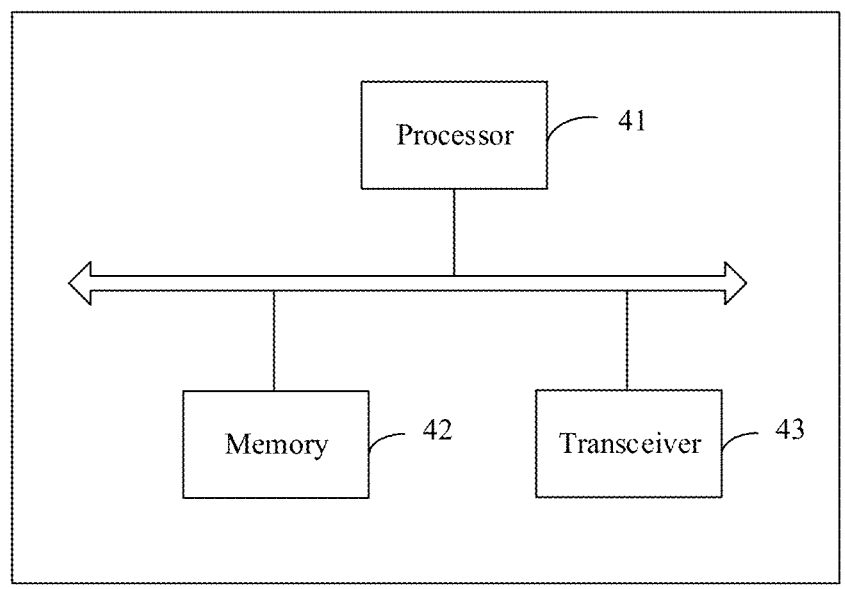
FIG. 8 is a schematic structural diagram of an apparatus for receiving uplink control information according to Embodiment 7 of this application.

FIG. 8 is a schematic structural diagram of an apparatus for receiving uplink control information according to Embodiment 7 of this application. The apparatus in this embodiment may be applied to a network device. As shown in FIG. 8, the apparatus provided in this embodiment includes a processor 41, a memory 42, and a transceiver 43. The memory 42 is configured to store an instruction, the transceiver 43 is configured to communicate with another device, and the processor 41 is configured to execute the instruction stored in the memory 42, so that the apparatus is enabled to perform the method performed by the network device in Embodiment 1 to Embodiment 3 of this application. Specific implementations and technical effects are similar, and details are not described herein again.

Embodiment 8 of this application provides a computer-readable storage medium. The computer-readable storage medium stores an instruction; and when the instruction is executed, a computer is enabled to perform the method performed by the terminal device in Embodiment 1 to Embodiment 3 of this application. Specific implementations and technical effects are similar, and details are not described herein again.

Embodiment 9 of this application provides a computer-readable storage medium. The computer-readable storage medium stores an instruction; and when the instruction is executed, a computer is enabled to perform the method performed by the network device in Embodiment 1 to Embodiment 3 of this application. Specific implementations and technical effects are similar, and details are not described herein again.

The processor in the foregoing embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of the present invention. The general-purpose processor may be a microprocessor, or the processor may be any conventional processor, or the like. The steps of the methods disclosed in the embodiments of the present invention may be directly performed and completed by a hardware decoding processor, or may be performed and completed by using a combination of hardware and software units in the decoding processor. The software unit may be located in a mature storage medium in the art, such as a random access memory (RAM), a flash memory, a read-only memory (ROM), a programmable read-only memory, an electrically erasable programmable memory, or a register. The storage medium is located in the memory, and the processor reads the instruction in the memory and completes the steps in the foregoing methods in combination with hardware of the processor.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated units may be implemented in a form of hardware, or may be implemented in a form of hardware in addition to a software function unit.

What is claimed is:

1. A method for sending uplink control information, comprising:
receiving a first physical downlink control channel (PDCCH) and a second PDCCH that are sent by a network device, wherein the first PDCCH and the second PDCCH are transmitted in a same time unit, the first PDCCH indicates a first physical uplink control channel (PUCCH) resource and is used to schedule a first downlink transport block (TB), and the second PDCCH indicates a second PUCCH resource and is used to schedule a second downlink TB; and sending, on the first PUCCH resource, response information of the first downlink TB and response information of the second downlink TB to the network device;

wherein the first PDCCH further indicates a third PUCCH resource, and the method further comprises:

sending, on the third PUCCH resource, the response information of the first downlink TB and/or the response information of the second downlink TB; and determining the first PUCCH resource and the third PUCCH resource based on information that is about an uplink resource indicator field and that is carried in the first PDCCH and configuration information of two PUCCH resource sets configured by the network device by using higher layer signaling; and wherein the determining the first PUCCH resource and the third PUCCH resource based on the information that is about the uplink resource indicator field and that is carried in the first PDCCH and the configuration information of the two PUCCH resource sets configured by the network device comprises:

obtaining through demodulation, based on a control resource set corresponding to an identifier of the control resource set associated with the two PUCCH resource sets, the first PDCCH from the control resource set, wherein the identifier of the control resource set is configured by the network device by using the higher layer signaling;

determining, based on a value that is of the uplink resource indicator field and that is carried in the first PDCCH, an index value of a PUCCH resource indicated by the first PDCCH; and determining the first PUCCH resource and the third PUCCH resource from the two PUCCH resource sets based on the index value of the PUCCH resource indicated by the first PDCCH.

2. The method according to claim 1, further comprising:
sending, on the second PUCCH resource, the response information of the first downlink TB and/or the response information of the second downlink TB.

3. The method according to claim 1, further comprising:
determining, based on first indication information corresponding to each PDCCH, response information carried on a PUCCH resource indicated by the PDCCH, wherein the first indication information is used to indicate that the response information carried on the PUCCH resource indicated by the PDCCH is response information of a downlink TB scheduled by using the PDCCH or response information of downlink TBs scheduled by using two PDCCHs, and the first indication information is carried in downlink control information (DCI) carried by the PDCCH.

4. The method according to claim 1, further comprising:
determining, based on first indication information corresponding to each PDCCH, response information carried on a PUCCH resource indicated by the PDCCH, wherein the first indication information is used to indicate that the response information carried on the PUCCH resource indicated by the PDCCH transmitted in a control resource set to which the PDCCH belongs is response information of a downlink TB scheduled by using the transmitted PDCCH or response information of downlink TBs scheduled by using two PDCCHs, and the first indication information is carried in the higher layer signaling.

5. The method according to claim 1, further comprising:
determining, based on second indication information carried in the first PDCCH, that response information of a downlink TB is fed back on both the first PUCCH resource and the third PUCCH resource, wherein the second indication information is used to indicate whether all PUCCH resources indicated by the first PDCCH are used to feed back the response information of the downlink TB.

6. The method according to claim 1, further comprising:
determining, based on first time information carried in the first PDCCH, a sequence number of a time unit for receiving the first PDCCH, and the configuration information of the two PUCCH resource sets configured by the network device by using the higher layer signaling, sequence numbers of time units for sending the first PUCCH resource and the third PUCCH resource; and sending, on the first PUCCH resource and the third PUCCH resource, the response information to the network device based on the sequence numbers of the time units.

7. The method according to claim 6, wherein configuration information of each PUCCH resource set comprises an offset factor, and the determining, based on the first time information carried in the first PDCCH, the sequence number of the time unit for receiving the first PDCCH, and the configuration information of the two PUCCH resource sets configured by the network device by using the higher layer signaling, the sequence numbers of time units for sending the first PUCCH resource and the third PUCCH resource comprises:

determining a sequence number of a transmission unit for sending a PUCCH resource according to:

$n'=n+k_1+k_{offset}$, wherein n' is the sequence number of the transmission unit for sending the PUCCH resource, n is a sequence number of a transmission unit for receiving a PDCCH, $k_{offset}$ is the offset factor, and $k_1$ is the first time information.

8. An apparatus for sending uplink control information, comprising:
a processor;
a receiver, configured to receive a first physical downlink control channel (PDCCH) and a second PDCCH that are sent by a network device, wherein the first PDCCH and the second PDCCH are transmitted in a same time unit, the first PDCCH indicates a first physical uplink control channel (PUCCH) resource and is used to schedule a first downlink transport block (TB), and the second PDCCH indicates a second PUCCH resource and is used to schedule a second downlink TB; and
a transmitter, configured to send, on the first PUCCH resource, response information of the first downlink TB and response information of the second downlink TB to the network device;
wherein the first PDCCH further indicates a third PUCCH resource, and the transmitter is further configured to:
send, on the third PUCCH resource, the response information of the first downlink TB and/or the response information of the second downlink TB;
wherein the processor is configured to determine the first PUCCH resource and the third PUCCH resource based on information that is about an uplink resource indicator field and that is carried in the first PDCCH and configuration information of two PUCCH resource sets configured by the network device by using higher layer signaling;

wherein when the processor is configured to determine the first PUCCH resource and the third PUCCH resource based on the information that is about the uplink resource indicator field and that is carried in the first PDCCH and the configuration information of the two PUCCH resource sets configured by the network device by using the higher layer signaling, the processor is specifically configured to:

obtain through demodulation, based on a control resource set corresponding to an identifier of the control resource set associated with the two PUCCH resource sets, the first PDCCH from the control resource set, wherein the identifier of the control resource set is configured by the network device by using the higher layer signaling;

determine, based on a value that is of the uplink resource indicator field and that is carried in the first PDCCH, an index value of a PUCCH resource indicated by the first PDCCH; and determine the first PUCCH resource and the third PUCCH resource from the two PUCCH resource sets based on the index value of the PUCCH resource indicated by the first PDCCH.

9. The apparatus according to claim 8, wherein the transmitter is further configured to:

send, on the second PUCCH resource, the response information of the first downlink TB and/or the response information of the second downlink TB.

10. The apparatus according to claim 8, further comprising:

a processor, configured to determine, based on first indication information corresponding to each PDCCH, response information carried on a PUCCH resource indicated by the PDCCH, wherein the first indication information is used to indicate that the response information carried on the PUCCH resource indicated by the PDCCH is response information of a downlink TB scheduled by using the PDCCH or response information of downlink TBs scheduled by using two PDCCHs, and the first indication information is carried in downlink control information (DCI) carried by the PDCCH.

11. The apparatus according to claim 8, further comprising:

a processor, configured to determine, based on first indication information corresponding to each PDCCH, response information carried on a PUCCH resource indicated by the PDCCH, wherein the first indication information is used to indicate that the response information carried on the PUCCH resource indicated by the PDCCH transmitted in a control resource set to which the PDCCH belongs is response information of a downlink TB scheduled by using the transmitted PDCCH or response information of downlink TBs scheduled by using two PDCCHs, and the first indication information is carried in the higher layer signaling.

12. The apparatus according to claim 8, further comprising:

a processor, configured to determine, based on second indication information carried in the first PDCCH, that response information of a downlink TB is fed back on both the first PUCCH resource and the third PUCCH resource, wherein the second indication information is used to indicate whether all PUCCH resources indicated by the first PDCCH are used to feed back the response information of the downlink TB.

13. The apparatus according claim 8, further comprising:

a processor, configured to determine, based on first time information carried in the first PDCCH, a sequence number of a time unit for receiving the first PDCCH, and the configuration information of the two PUCCH resource sets configured by the network device by using the higher layer signaling, sequence numbers of time units for sending the first PUCCH resource and the third PUCCH resource, wherein the transmitter is specifically configured to send, on the first PUCCH resource and the third PUCCH resource, the response information to the network device based on the sequence numbers of the time units.

14. The apparatus according to claim 13, wherein configuration information of each PUCCH resource set comprises an offset factor, and the processor determines, based on the first time information carried in the first PDCCH, the sequence number of the time unit for receiving the first PDCCH, and the configuration information of the two PUCCH resource sets configured by the network device by using the higher layer signaling, the sequence numbers of time units for sending the first PUCCH resource and the third PUCCH resource comprises:

determining a sequence number of a transmission unit for sending a PUCCH resource according to:

$n'=n+k_1+k_{offset}$, wherein n' is the sequence number of the transmission unit for sending the PUCCH resource, n is a sequence number of a transmission unit for receiving a PDCCH, $k_{offset}$ is the offset factor, and $k_1$ is the first time information.

* * * * *